United States Patent
Lee et al.

(10) Patent No.: US 9,505,630 B2
(45) Date of Patent: Nov. 29, 2016

(54) SYNTHESIS METHOD FOR TUNING SHAPE, EXPOSED CRYSTAL FACE AND SIZE OF TITANIUM DIOXIDE

(71) Applicant: NATIONAL TSING HUA UNIVERSITY, Hsinchu (TW)

(72) Inventors: Chi-Young Lee, Hsinchu (TW); Hsin-Tien Chiu, Hsinchu (TW); Min-Han Yang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 205 days.

(21) Appl. No.: 14/165,482

(22) Filed: Jan. 27, 2014

(65) Prior Publication Data

US 2015/0037245 A1 Feb. 5, 2015

(30) Foreign Application Priority Data

Jul. 31, 2013 (TW) .............................. 102127420 A

(51) Int. Cl.
| | | |
|---|---|---|
| *C01G 23/053* | (2006.01) | |
| *C25B 1/00* | (2006.01) | |
| *B01J 37/03* | (2006.01) | |
| *B01J 35/00* | (2006.01) | |
| *B01J 21/06* | (2006.01) | |
| *B01J 37/10* | (2006.01) | |
| *B01J 35/02* | (2006.01) | |
| *B01J 35/10* | (2006.01) | |
| *B01J 23/04* | (2006.01) | |

(52) U.S. Cl.
CPC ............ *C01G 23/053* (2013.01); *B01J 21/063* (2013.01); *B01J 23/04* (2013.01); *B01J 35/002* (2013.01); *B01J 35/004* (2013.01); *B01J 37/031* (2013.01); *B01J 37/10* (2013.01); *C25B 1/003* (2013.01); *B01J 35/023* (2013.01); *B01J 35/026* (2013.01); *B01J 35/1009* (2013.01); *B01J 35/1014* (2013.01); *C01P 2002/84* (2013.01); *C01P 2004/03* (2013.01); *C01P 2004/04* (2013.01); *C01P 2004/10* (2013.01); *C01P 2004/41* (2013.01); *C01P 2004/64* (2013.01); *C01P 2006/12* (2013.01)

(58) Field of Classification Search
CPC ..... C01G 23/053; B01J 21/063; B01J 23/04; B01J 35/002; B01J 35/004; B01J 37/031; B01J 37/10; C25B 1/003
See application file for complete search history.

(56) References Cited

PUBLICATIONS

Wu et al (Controllable Synthesis of TiO2 Single Crystals with Tunable Shapes Using Ammonium-Exchanged Titanate Nanowires as Precursors, Crystal Growth Design, vol. 10, No. 5, (2010) pp. 2111-2115).*

(Continued)

*Primary Examiner* — Melvin C Mayes
*Assistant Examiner* — Michael Forrest
(74) *Attorney, Agent, or Firm* — WPAT, P.C., Intellectual Property Attorneys; Anthony King

(57) ABSTRACT

The present invention relates to a method for tuning shape, exposed crystal face and size of titanium dioxide by using inorganic salts and changing pH value of the reaction environment. The present invention changes the shape of titanium dioxide crystal and the exposed face thereof by adding different inorganic salts during the reaction to utilize different alkali metal ions of the inorganic salts and also can change the size of titanium dioxide crystal by tuning different pH value in the reaction. By this synthesis method, the shape and size of titanium dioxide can be tuned for different applications, such as photocatalysis, dye-sensitized solar cells, photolysis of water and other optoelectronic components or materials, to achieve their optimal efficiencies.

15 Claims, 6 Drawing Sheets

(56) References Cited

PUBLICATIONS

Walsh et al (Protonated Titanates and TiO2 Nanostructured Materials: Synthesis, Properties, and Applications, Advanced Materials, 2006, 18, 2807-2824).*

Jin et al (TEM study on the formation mechanism of sodium titanate nanotubes, Journal of Nanoparticle Research (2007) 9, 1173-1180).*

Min-Han Yang et al., Alkali metal ion assisted synthesis of faceted anatase TiO23, CrystEngComm, 2013, 15, 2966-2971.

* cited by examiner

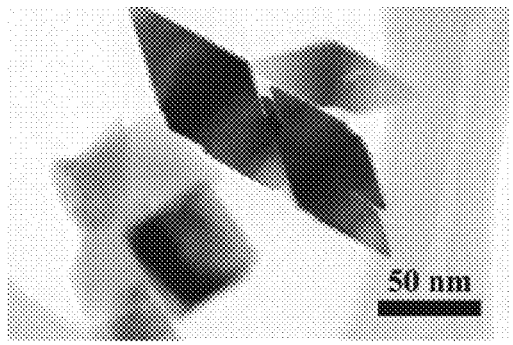
FIG. 2(A)
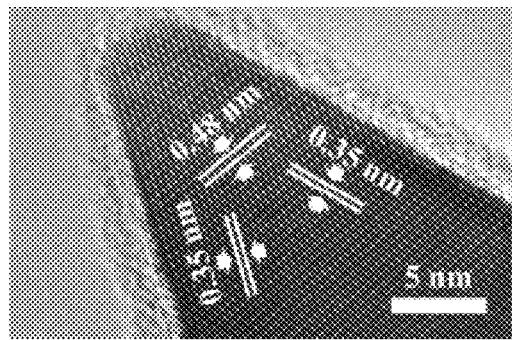
FIG. 2(B)
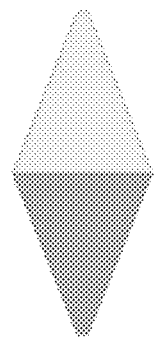
FIG. 2(C)
| crystal face | stacking rate of crystal face |
|---|---|
| (1,0,0) | 1.1 |
| (0,1,0) | 2.4 |
| (0,0,1) | 1 |
FIG. 2(D)
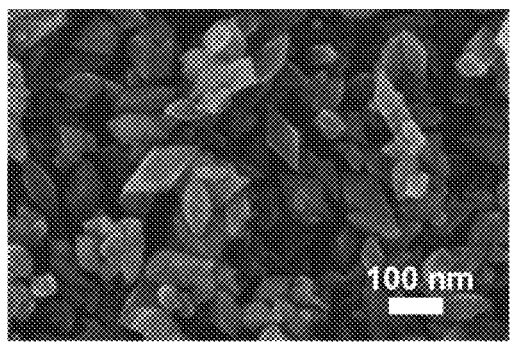
FIG. 2(E)
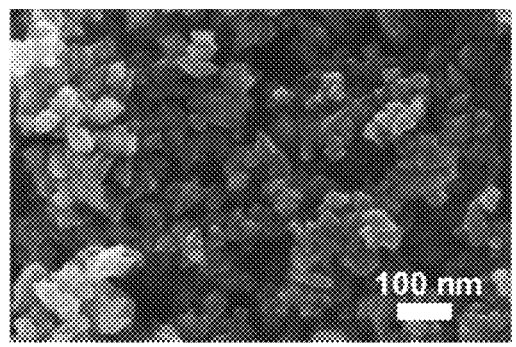
FIG. 2(F)

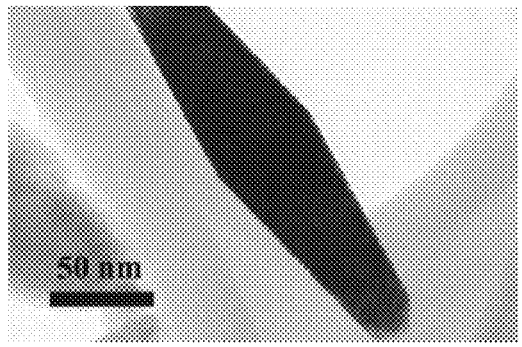
FIG. 3(A)
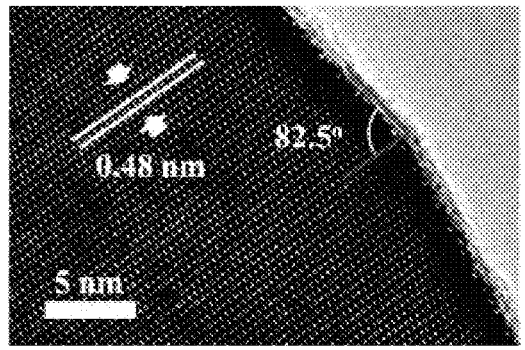
FIG. 3(B)
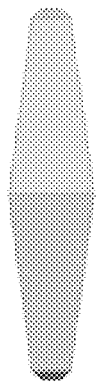
FIG. 3(C)
| crystal face | stacking rate of crystal face |
|---|---|
| (1,0,0) | 1.1 |
| (0,0,1) | 4.4 |
| (3,0,1) | 1 |
| (1,0,3) | 3.5 |
FIG. 3(D)
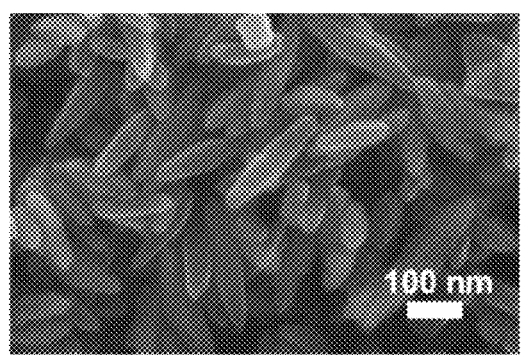
FIG. 3(E)
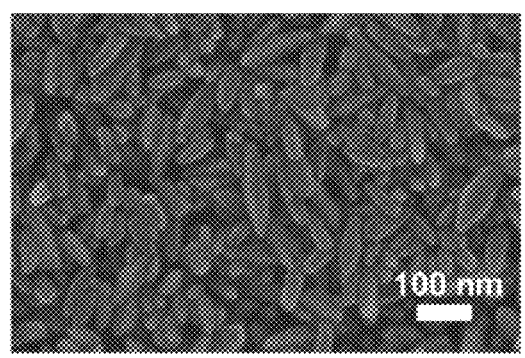
FIG. 3(F)

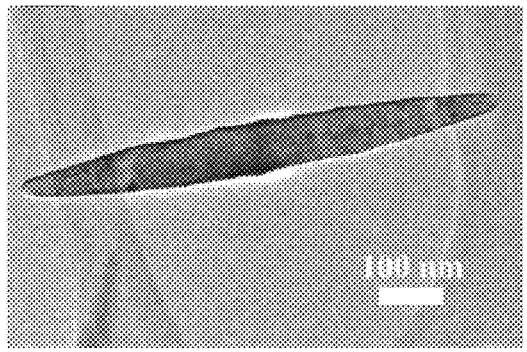
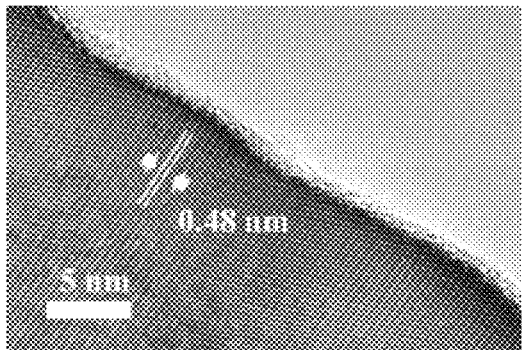
FIG. 4(A)　　　　　　　　　FIG. 4(B)
| crystal face | stacking rate of crystal face |
|---|---|
| (1,0,0) | 0.7 |
| (0,0,1) | 5.5 |
| (3,0,1) | 1 |
| (1,0,3) | 4.3 |
FIG. 4(C)　　　　　　　　　FIG. 4(D)
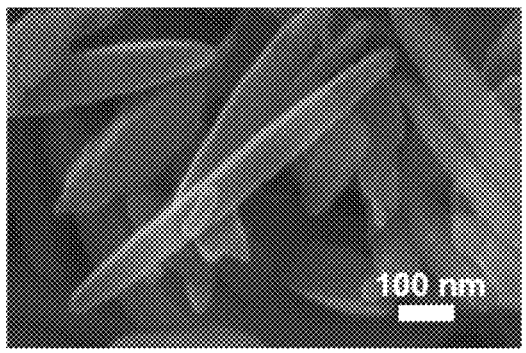
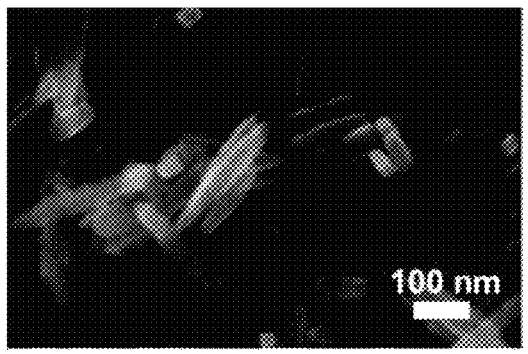
FIG. 4(E)　　　　　　　　　FIG. 4(F)

SYNTHESIS METHOD FOR TUNING SHAPE, EXPOSED CRYSTAL FACE AND SIZE OF TITANIUM DIOXIDE

CROSS-REFERENCE TO RELATED APPLICATIONS

This Non-provisional application claims priority under 35 U.S.C. §119(a) on Patent Application No(s). 102127420 filed in Taiwan, Republic of China, Jul. 31, 2013, the entire contents of which are hereby incorporated by reference.

BACKGROUND OF THE INVENTION

Field of the Invention

This invention relates to a synthesis method of titanium dioxide and, more particularly, to a synthesis method for tuning shape, exposed crystal face and size of titanium dioxide.

Description of the Related Art

Titanium dioxide is a semiconductor material and has many excellent properties, such as photoactivity, low toxicity and low cost, so that it is extensively invested for many application. Titanium dioxide has two main crystal structures: rutile and anatase. In these two crystal structures, each $Ti^{4+}$ ion is surrounded by a distorted octahedron of six oxygen ions. In the rutile structure, each octahedron is neighbored by ten octahedrons of $TiO_2$ with different shapes and sizes in which two of them share the edge of the octahedron and eight of them share the oxygen atom at the corner of the octahedron. In the anatase structure, each octahedron is neighbored with eight octahedrons, and four of them share the edge and another four share the corner. The difference of these geometrical structures results in different density and electronic structure of these two crystal shapes. Also, their special surface atomic arrangement and size will affect the physical and chemical properties thereof and make the catalytic behavior of $TiO_2$ different.

Photocatalyst is an application of $TiO_2$ material. It is to utilize the energy of the light source with specific wavelength under the irradiation of the light source to cause catalytic capability. These radicals having powerful oxidizing ability almost can decompose all organic matters, which are harmful to human body and environment. Therefore, the surrounding oxygen molecules can be excited to highly active .OH and $.O_2$ radicals to disinfect, suppress viruses, deodorize and decompose organic matters. And then, $TiO_2$ is mostly often used as a cleaning or experimental matter due to the strongly oxidizing or reducing ability, chemical stability and non-toxicity.

Moreover, dye-sensitized solar cell is another application of $TiO_2$. It is to utilize $TiO_2$ coated by photosensitizers dye as the electrode. When the light irradiates the dye, the electron will transfer from ground state to excited state and the excited electron will enter the conductive band of $TiO_2$ semiconductor. Then the electron will transfer to the other electrode through outside circuit and further reduce the dye by oxidized-reduced reaction in order to form an electron circle.

However, in the related documents, most of the synthesis methods of $TiO_2$ material utilize organic surfactant for tuning the shape of crystal. But the addition of the organic surfactant will produce organic waste in the reaction process which is difficult to deal with and contaminates the environment. Therefore, the synthesis method provided in the present invention not only prevents the problems of contamination during the synthesized process, but also be benefit to the related industry of $TiO_2$ materials.

BRIEF SUMMARY OF THE INVENTION

According to the above, the present invention provides a method for tuning the shape and size of titanium dioxide by using the inorganic salt, which is different from the use of the organic surfactant before. The inorganic salt has a low tendency to cause damage to environment and high solubility in water so that it is convenient for the wash and the separation of titanium dioxide product. And further, such new synthesis method has high handling for tuning the size and the shape of titanium dioxide in response to different application to achieve the optimal efficiencies.

The present invention discloses a synthesis method of titanium dioxide, and it at least comprises the following steps:

using a titanate salt solution as a precursor;
an adding step for adding an inorganic salt material to the precursor;
a first heating step performed after the adding step for heating the precursor to obtain a reactant; and
a drying step performed after the first heating step for drying the reactant to fabricate a crystalline titanium dioxide material.

In one embodiment of the invention, the step of using the titanate salt solution as the precursor further comprises:

adding a noncrystalline titanium dioxide material to a sodium hydroxide solution for fabricating a mixed solution;
a second heating step for heating the mixed solution;
a filtering step performed after the second heating step for filtering the unreacted sodium hydroxide of the mixed solution; and
adding a solvent to the mixed solution after the filtering step to fabricate the titanate salt solution.

Accordingly, the second heating step is performed to heat the mixed solution in an atmospheric pressure reflux environment.

Accordingly, the second heating step is performed at 150° C. and under atmospheric pressure for 48 hours.

In one embodiment of the invention, the first heating step further comprises a step of tuning the precursor to an acidic pH value or a basic pH value.

Accordingly, a hydrochloric acid solution is used in tuning the precursor to the acidic pH value or a basic pH value.

In one embodiment of the invention, the first heating step is performed to heat the precursor in a high pressure environment.

Accordingly, the first heating step is performed at high pressure and at 200° C. for 20 hours.

In one embodiment of the invention, the drying step is performed at 50° C.

In one embodiment of the invention, the titanium salt solution is a solution comprising sodium titanium.

In one embodiment of the invention, the inorganic salt material is a salt comprising sodium ions, lithium ions or potassium ions.

Accordingly, the inorganic salt material is a combination comprising sodium chloride, lithium chloride or potassium chloride.

The features and advantages of the present invention will be understood in the following illustration, please refer to FIGS. 1~8 as reading.

BRIEF DESCRIPTION OF THE DRAWINGS

FIG. 2(A) and FIG. 2(B) are TEM images of crystalline titanium dioxide material fabricated from the inorganic salt material, which is a combination comprising lithium chloride, according to an embodiment of the present invention;

FIG. 2(C) and FIG. 2(D) are schematic diagrams showing shape of crystalline titanium dioxide material fabricated from the inorganic salt material, which is a combination comprising lithium chloride, and stacking rate of each crystal face according to an embodiment of the present invention;

FIG. 2(E) and FIG. 2(F) are FESEM images of crystalline titanium dioxide material fabricated from the inorganic salt material, which is a combination comprising lithium chloride, according to an embodiment of the present invention;

FIG. 3(A) and FIG. 3(B) are TEM images of crystalline titanium dioxide material fabricated from the inorganic salt material, which is a combination comprising sodium chloride, according to an embodiment of the present invention;

FIG. 3(C) and FIG. 3(D) are schematic diagrams showing shape of crystalline titanium dioxide material fabricated from the inorganic salt material, which is a combination comprising sodium chloride, and stacking rate of each crystal face according to an embodiment of the present invention;

FIG. 3(E) and FIG. 3(F) are FESEM images of crystalline titanium dioxide material fabricated from the inorganic salt material, which is a combination comprising sodium chloride, according to an embodiment of the present invention;

FIG. 4(A) and FIG. 4(B) are TEM images of crystalline titanium dioxide material fabricated from the inorganic salt material, which is a combination comprising potassium chloride, according to an embodiment of the present invention;

FIG. 4(C) and FIG. 4(D) are schematic diagrams showing shape of crystalline titanium dioxide material fabricated from the inorganic salt material, which is a combination comprising potassium chloride, and stacking rate of each crystal face according to an embodiment of the present invention;

FIG. 4(E) and FIG. 4(F) are FESEM images of crystalline titanium dioxide material fabricated from the inorganic salt material, which is a combination comprising potassium chloride, according to an embodiment of the present invention;

DETAILED DESCRIPTION OF THE INVENTION

Figure 1:
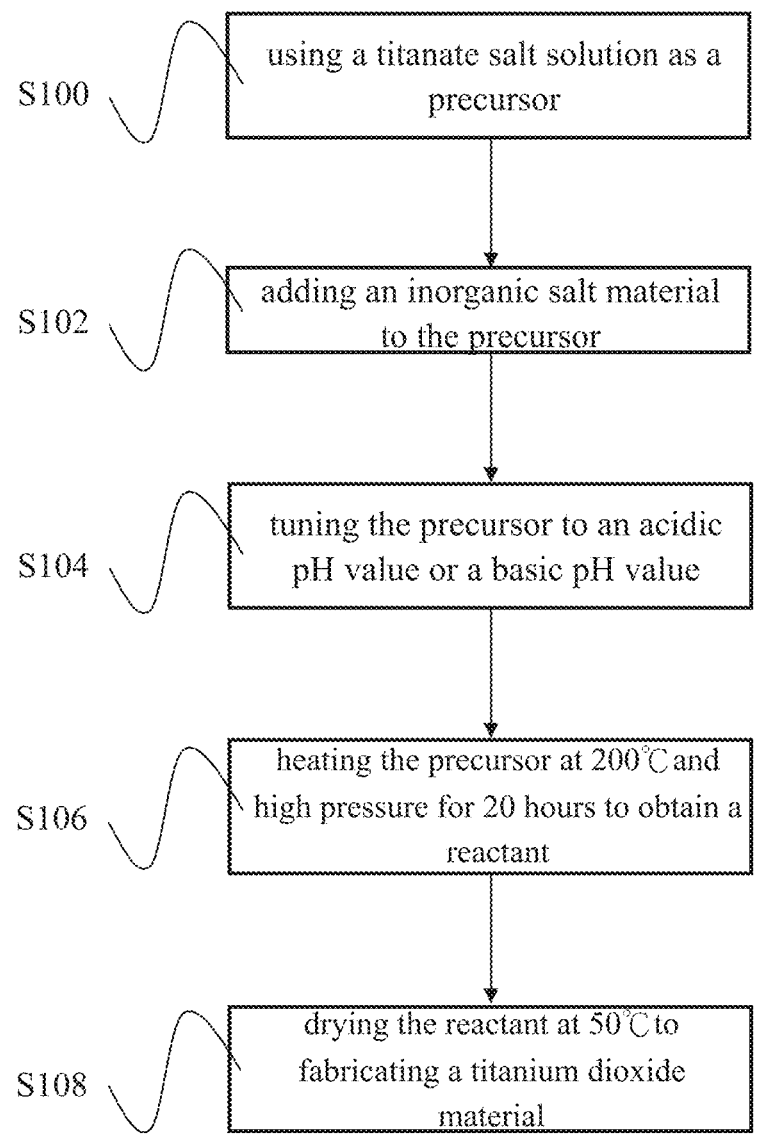
FIG. 1 is a flow chart showing a synthesis method for tuning titanium dioxide according to an embodiment of the present invention.

Please refer to FIG. 1, FIG. 1 is a flow chart showing a synthesis method for tuning shape, exposed crystal face and size of titanium dioxide according to an embodiment of the present invention. As shown in step S100, the beginning is to use a titanate salt solution as a precursor first. Preferably, the titanate salt solution is a solution comprising sodium titanate. In an embodiment, the fabrication of the titanate salt solution is conducted by adding a noncrystalline titanium dioxide ($TiO_2$) material to a sodium hydroxide (NaOH) solution for fabricating a mixed solution, heating the mixed solution at 150° C. in an atmospheric pressure reflux environment for 48 hours, filtering the unreacted NaOH and further adding a solvent to fabricate the sodium titanate ($Na_2TiO_3$) solution. In an embodiment, an aqueous solution is added.

An inorganic salt material is then added to the precursor as shown in step S102. The inorganic salt material is a salt comprising sodium ions, lithium ions or potassium ions. Preferably, the inorganic salt material is a combination comprising sodium chloride, lithium chloride or potassium chloride.

As shown in step S104, the precursor is then tuned to an acidic pH value or a basic pH value. In an embodiment, an aqueous hydrochloric acid solution with different dosage is added for tuning the precursor to the acidic pH value or the basic pH value.

And then, as shown in step S106, the precursor is heated to obtain a reactant. In an embodiment, the heating of the precursor is performed at 200° C. and under a high pressure environment for 20 hours.

As shown in step S108, the reactant is then dried and fabricated to a crystalline titanium dioxide material. In an embodiment, it is performed at 50° C. to obtain the crystalline titanium dioxide material.

Accordingly, the synthesis method of titanium dioxide provided in the present invention is to add the inorganic salt during the synthesis process for tuning the shape of titanium dioxide, and the principle thereof is to utilize different alkali metal ions of the inorganic salt to cause the difference of the $TiO_2$ growth along different directions for synthesizing $TiO_2$ particles with different shapes. Moreover, the nucleation rate and the growth rate can be decided by tuning the pH value of the environment during the synthesis process for further controlling the size of $TiO_2$. In an embodiment, when the pH value of the synthesis environment is lower, higher concentration of hydrogen ions can speed the nucleation rate of $TiO_2$ and assist in increasing the nucleation amount to result in reducing the $TiO_2$ particles.

Please refer to FIG. 2, FIG. 2 shows the crystalline titanium dioxide material fabricated from the inorganic salt material, which is a combination comprising lithium chloride, according to an embodiment of the present invention. As shown in FIG. 2(A) to FIG. 2(D), it is an octahedral $TiO_2$ material with exposed {101} facet. Under a condition of tuning the pH value, the size of the crystalline $TiO_2$ material is around 100 nm as shown in FIG. 2(E) when the pH value is higher (the pH value is around 9) and that of the crystalline $TiO_2$ material is around 50 nm as shown in FIG. 2(F) when the pH value is lower (the pH value is around 6).

Please refer to FIG. 3, FIG. 3 shows the crystalline titanium dioxide material fabricated from the inorganic salt material, which is a combination comprising sodium chloride, according to an embodiment of the present invention. As shown in FIG. 3(A) to FIG. 3(D), it is a spindle-shaped $TiO_2$ material with exposed {301} facet. Under a condition of tuning the pH value, the length of the long axis of the crystalline $TiO_2$ material is approximately ranged from 300 nm to 400 nm as shown in FIG. 3(E) when the pH value is higher (the pH value is around 9) and that of the crystalline $TiO_2$ material is approximately ranged from 100 nm to 150 nm as shown in FIG. 3(F) when the pH value is lower (the pH value is around 6).

Please refer to FIG. 4, FIG. 4 shows the crystalline titanium dioxide material fabricated from the inorganic salt material, which is a combination comprising potassium chloride, according to an embodiment of the present invention. As shown in FIG. 4(A) to FIG. 4(D), it is a needle-like $TiO_2$ material with exposed {301} facet at its tip. Under a condition of tuning the pH value, the length of the long axis of the crystalline $TiO_2$ material is over 500 nm as shown in FIG. 4(E) when the pH value is higher (the pH value is around 9) and that of the crystalline $TiO_2$ material is approximately ranged from 200 nm to 300 nm as shown in FIG. 4(F) when the pH value is lower (the pH value is around 6).

$TiO_2$ with different shapes have different catalytic performances resulted from their different atomic arrangements at the surfaces. And then, $TiO_2$ with different sizes have different performances for optical wave scattering and thus influence the performance of capturing light energy.

Figure 5:
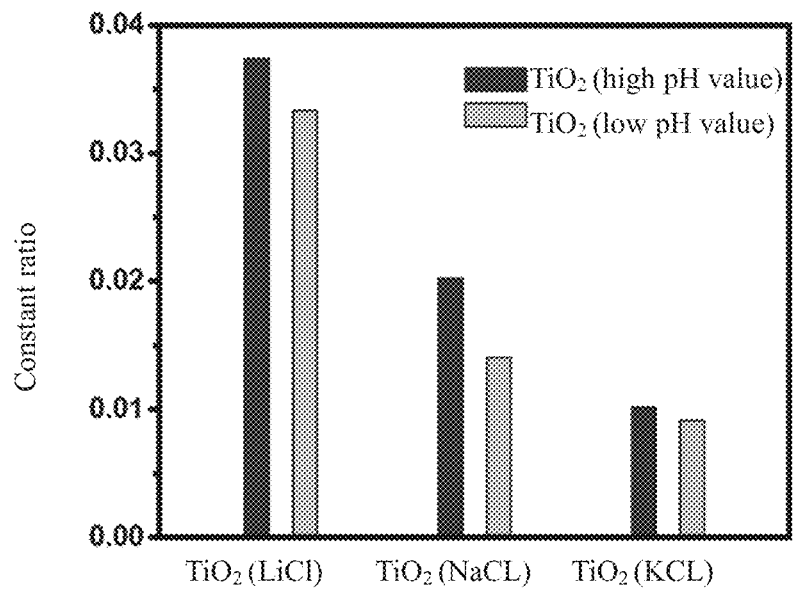
FIG. 5 is a diagram showing the comparison of the reaction rate constants of applying titanium dioxide with different shapes and sizes in photocatalysis according to an embodiment of the present invention.
Figure 6:
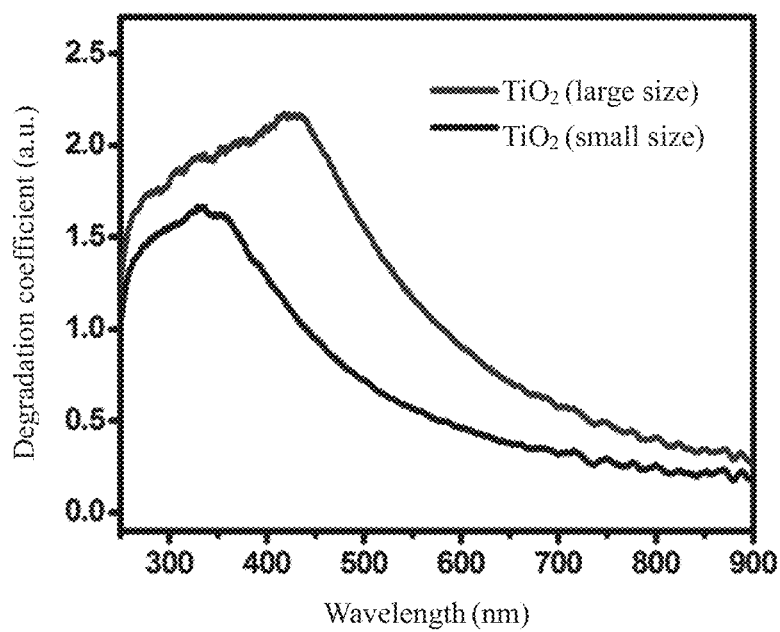
FIG. 6 is a diagram showing the comparison of UV-vis spectrums of titanium dioxide with different sizes according to an embodiment of the present invention.

Please refer to FIG. 5 and FIG. 6, the figures shows the photocatalytic tests of the inorganic salt material according to an embodiment of the present invention. It can be found that the photoactivities of $TiO_2$ with various shapes are different as shown in FIG. 5, and the photoactivity of {101} facet of the crystalline $TiO_2$ material fabricated by adding lithium chloride is larger than that of {301} facet of the crystalline $TiO_2$ material fabricated by adding potassium chloride. Furthermore, with respect to the comparison of UV-vis spectrum as shown in FIG. 6, it can be found that the crystal with larger size has better scattering behavior when $TiO_2$ are suspended in water. Therefore, the rhombus $TiO_2$ material fabricated by adding lithium chloride has better photoactivity due to its exposed {101} facet and higher scattering behavior.

The crystalline $TiO_2$ material synthesized in the present invention also has different performances for applying in dye-sensitized solar cells due to their different shapes, exposed crystal faces and sizes. As shown in the following table, the rhombus $TiO_2$ material, which is fabricated by adding lithium chloride, has higher surface area and thus increases the amount of the dye absorbed so that there is better photoelectric conversion efficiency in the use of the solar cell.

| $TiO_2$ | | $V_{oc}$ (mV) | $J_{sc}$ (mA cm$^{-2}$) | FF (%) | η (%) | surface area (m$^2$ g$^{-1}$) | Adsorbed dye (*$10^{-7}$ mol cm$^{-2}$) |
|---|---|---|---|---|---|---|---|
| LiCl | Low | 730 | 14.08 | 63 | 6.45 | 39.7 | 1.41 |
| NaCl | pH | 740 | 13.15 | 64 | 6.24 | 37.1 | 1.29 |
| KCl | | 770 | 11.71 | 65 | 5.89 | 25.7 | 0.93 |
| LiCl | High | 730 | 12.36 | 63 | 5.72 | 26.2 | 1.13 |
| NaCl | pH | 760 | 10.48 | 65 | 5.19 | 23.1 | 0.91 |
| KCl | | 780 | 6.61 | 63 | 3.27 | 8.39 | 0.52 |
| P25 | | 760 | 10.38 | 68 | 5.33 | 51.2 | 1.21 |

Figure 7:
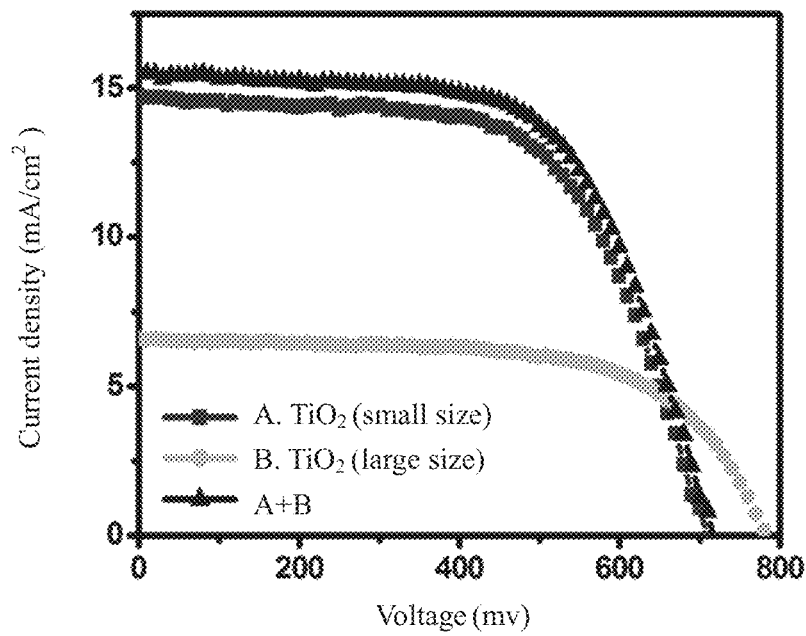
FIG. 7 is a diagram showing the comparison of the efficiencies of applying titanium dioxide with mixed sizes in dye-sensitized solar cell according to an embodiment of the present invention.
Figure 8:
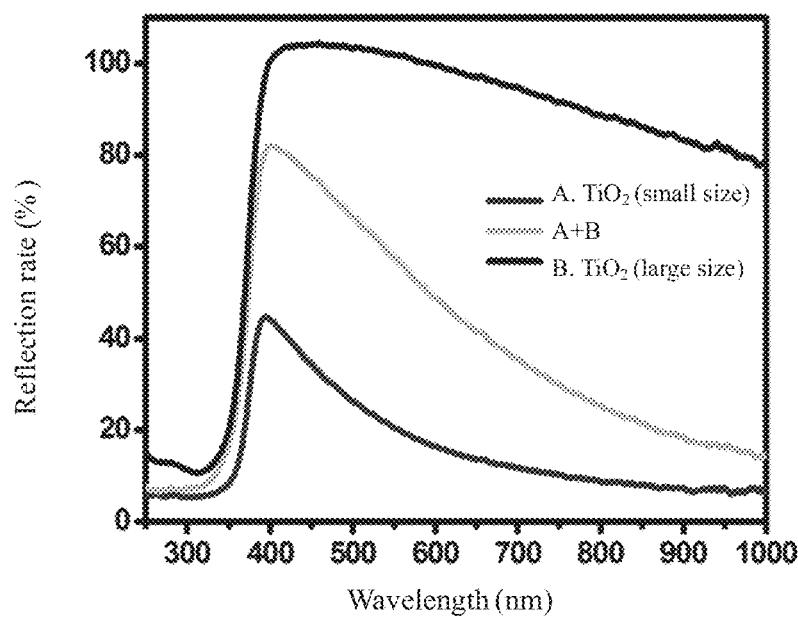
FIG. 8 is a diagram showing the comparison of reflection spectrums of titanium dioxide electrodes with different sizes according to an embodiment of the present invention.

In addition, please refer to FIG. 7 and FIG. 8, the figures shows that the capturing behavior of sunlight can be promoted by incorporating the needle-like $TiO_2$ material, which is fabricated by adding potassium chloride, into the solar cell due to its better scattering behavior, and further the efficiency of the dye-sensitized solar cell is also increased.

Compared with conventional method for tuning the shape of titanium dioxide crystal by using organic surfactant, such new synthesis method will not produce organic waste so that it has a low tendency to cause damage to environment, and the wash and the separation of the product is convenient. Moreover, this synthesis method has high handling for tuning the shape and size of titanium dioxide by utilizing different alkali metal ions of the inorganic salts and also can change the size of titanium dioxide crystal by tuning different pH value in the reaction.

By this synthesis method, the shape and size of titanium dioxide can be tuned for different applications to achieve their optimal efficiencies of the optoelectronic components, such as photocatalysis, dye-sensitized solar cells and photolysis of water, electrode material and coating.

What is claimed is:

1. A synthesis method of octahedral titanium dioxide material with exposed {101} facet, at least comprising:
    a. adding a noncrystalline titanium dioxide material to a sodium hydroxide solution for fabricating a mixed solution;
    b. a first heating step for heating the mixed solution;
    c. filtering step performed after the first heating step for filtering the unreacted sodium hydroxide of the mixed solution;
    d. adding a solvent to the mixed solution after the filtering step to fabricate sodium titanium solution as a precursor;
    e. adding an inorganic salt material to the precursor, wherein the inorganic salt material is a salt comprising lithium ions;
    f. a second heating step performed after the inorganic salt material for heating the precursor to obtain a reactant; and
    g. a drying step performed after the second heating step for drying the reactant to fabricate a crystalline titanium dioxide material.

2. The synthesis method according to claim 1, wherein the first heating step is performed to heat the mixed solution in an atmospheric pressure reflux environment.

3. The synthesis method according to claim 2, wherein the first heating step is performed at 150° C. and under atmospheric pressure for 48 hours.

4. The synthesis method according to claim 1, wherein the second heating step further comprising:
    tuning the precursor to pH 6, if the size of the crystalline titanium dioxide material will be ranged around 50 nm;
    or tuning the precursor to pH 9, if the size of the crystalline titanium dioxide material will be ranged around 100 nm.

5. The synthesis method according to claim 4 using a hydrochloric acid solution in tuning the precursor to pH 6.

6. The synthesis method according to claim 1, wherein the second heating step is performed to heat the precursor in a high pressure environment.

7. The synthesis method according to claim 6, wherein the second heating step is performed at high pressure and at 200° C. for 20 hours.

8. The synthesis method according to claim 1, wherein the drying step is performed at 50° C.

9. The synthesis method according to claim 1, wherein the salt is lithium chloride.

10. A synthesis method of spindle-shaped titanium dioxide material with exposed {301} facet, at least comprising:
   a. adding a noncrystalline titanium dioxide material to a sodium hydroxide solution for fabricating a mixed solution;
   b. a first heating step for heating the mixed solution;
   c. filtering step performed after the first heating step for filtering the unreacted sodium hydroxide of the mixed solution;
   d. adding a solvent to the mixed solution after the filtering step to fabricate a titanate salt solution as a precursor;
   e. adding an inorganic salt material to the precursor, wherein the inorganic salt material is a salt comprising sodium ions;
   f. a second heating step performed after the inorganic salt material for heating the precursor to obtain a reactant; and
   g. a drying step performed after the second heating step for drying the reactant to fabricate a crystalline titanium dioxide material.

11. The synthesis method according to claim 10, wherein the second heating step further comprising:
   tuning the precursor to pH 6, if the long axis of the crystalline titanium dioxide material will be ranged around 100-150 nm; or
   tuning the precursor to pH 9, if the long axis of the crystalline titanium dioxide material will be ranged around 300-400 nm.

12. The synthesis method according to claim 10, wherein the salt is sodium chloride.

13. The synthesis method according to claim 10, wherein the second heating step further comprising:
   tuning the precursor to pH 6, if the long axis of the crystalline titanium dioxide material will be ranged around 200-300 nm; or
   tuning the precursor to pH 9, if the long axis of the crystalline titanium dioxide material will be ranged around 500 nm.

14. The synthesis method according to claim 10, wherein the salt is potassium chloride.

15. A synthesis method of needle-like titanium dioxide material with exposed {301} facet at its tip, at least comprising:
   a. adding a noncrystalline titanium dioxide material to a sodium hydroxide solution for fabricating a mixed solution;
   b. a first heating step for heating the mixed solution;
   c. filtering step performed after the first heating step for filtering the unreacted sodium hydroxide of the mixed solution;
   d. adding a solvent to the mixed solution after the filtering step to fabricate a titanate salt solution as a precursor;
   e. adding an inorganic salt material to the precursor, wherein the inorganic salt material is a salt comprising potassium ions;
   f. a second heating step performed after the inorganic salt material for heating the precursor to obtain a reactant; and
   g. a drying step performed after the second heating step for drying the reactant to fabricate a crystalline titanium dioxide material.

* * * * *